United States Patent
Uchiyama

(10) Patent No.: US 9,684,225 B2
(45) Date of Patent: Jun. 20, 2017

(54) OPTICAL APPARATUS AND DRIVE CONTROLLING METHOD

(71) Applicant: CANON KABUSHIKI KAISHA, Tokyo (JP)

(72) Inventor: Minoru Uchiyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 14/624,814

(22) Filed: Feb. 18, 2015

(65) Prior Publication Data

US 2015/0241756 A1  Aug. 27, 2015

(30) Foreign Application Priority Data

Feb. 21, 2014  (JP) .................................. 2014-031385

(51) Int. Cl.
- *H04N 5/232* (2006.01)
- *G03B 13/36* (2006.01)
- *G03B 3/10* (2006.01)

(52) U.S. Cl.
CPC ............... *G03B 13/36* (2013.01); *G03B 3/10* (2013.01); *H04N 5/23212* (2013.01); *G03B 2205/0046* (2013.01)

(58) Field of Classification Search
CPC ........... H04N 5/23212; H04N 5/23296; G03B 13/36; G03B 3/10; G03B 2205/0046
USPC ............. 348/347, 345, 240.99, 240.1, 240.2; 396/79–83, 85, 379; 359/697, 698
See application file for complete search history.

(56) References Cited

U.S. PATENT DOCUMENTS

| | | | | |
|---|---|---|---|---|
| 5,764,290 A * | 6/1998 | Hirota | ................ | H04N 5/23212 250/201.7 |
| 5,815,203 A * | 9/1998 | Lee | .................... | H04N 5/23212 348/240.3 |
| 6,070,016 A * | 5/2000 | Kaneda | .................. | G02B 7/102 348/335 |
| 6,624,851 B1 * | 9/2003 | Okajima | ................ | G02B 7/102 348/347 |
| 7,526,191 B2 * | 4/2009 | Lin | ........................ | G03B 17/00 396/81 |
| 8,605,204 B2 * | 12/2013 | Yamanaka | ............. | G02B 7/102 348/345 |

(Continued)

FOREIGN PATENT DOCUMENTS

| | | |
|---|---|---|
| JP | 01-232313 A | 9/1989 |
| JP | 2009128614 A | 6/2009 |
| JP | 2013242353 A | 12/2013 |

*Primary Examiner* — Tuan Ho
*Assistant Examiner* — Marly Camargo
(74) *Attorney, Agent, or Firm* — Rossi, Kimms & McDowell LLP

(57) ABSTRACT

A controller controls a focus lens driver so as to maintain an in-focus state associated with a magnification variation, based on information on a tracking curve that represents a position of the focus lens corresponding to an object distance and a focal length of an image-pickup optical system. The controller controls the focus lens driver so as to prevent the focus lens from being moved for focusing based on a difference between an actual position of the focus lens and the position of the focus lens indicated by the tracking curve in a case the focus lens driver is driving the focus lens based on information on the tracking curve.

4 Claims, 6 Drawing Sheets

(56) References Cited

U.S. PATENT DOCUMENTS

| | | | | |
|---|---|---|---|---|
| 2003/0030735 A1* | 2/2003 | Ike | .................... | H04N 5/23212 |
| | | | | 348/240.3 |
| 2004/0061949 A1* | 4/2004 | Yakita | .................... | G02B 7/102 |
| | | | | 359/697 |
| 2005/0275743 A1* | 12/2005 | Kikuchi | ................... | G02B 7/36 |
| | | | | 348/345 |
| 2006/0056059 A1* | 3/2006 | Ozawa | ................... | G02B 7/102 |
| | | | | 359/694 |
| 2010/0066864 A1* | 3/2010 | Abe | ................... | H04N 5/23209 |
| | | | | 348/240.3 |
| 2010/0290772 A1* | 11/2010 | Ito | .......................... | G03B 17/00 |
| | | | | 396/79 |
| 2013/0308932 A1* | 11/2013 | Nagao | ................... | G03B 13/36 |
| | | | | 396/125 |
| 2013/0308933 A1* | 11/2013 | Uchiyama | ............. | G03B 13/36 |
| | | | | 396/125 |

\* cited by examiner d=L×S

OPTICAL APPARATUS AND DRIVE CONTROLLING METHOD

BACKGROUND OF THE INVENTION

Field of the Invention

The present invention relates to an optical apparatus and a drive controlling method, which provide autofocus on a moving object (moving-object AF) using an image-pickup optical system configured to correct a variation of an image plane associated with a magnification variation.

Description of the Related Art

The improved precision of the moving-object AF has recently been increasingly demanded. Japanese Patent Laid-Open No. ("JP") 2009-128614 proposes a camera configured to acquire a driving target position of a focus lens by using a detected defocus amount for a feedback value to be sent to a controller, to correct the driving target position based on the focus lens potion at the acquisition time, and to control a prediction of a moving object based on the corrected driving target position.

It is known as a tracking control in a rear-focus type magnification varying optical system to correct a variation of an image plane associated with a magnification variation by moving a focus lens, as the variable-magnification lens is moved, and to maintain the in-focus state. The tracking control utilizes pre-stored information of an electronic cam (tracking curve) that indicates the in-focus position of the focus lens for the position of the variable-magnification lens (or focal length) for each object distance. As the variable-magnification lens is moved, positioning of the focus lens is controlled along the electronic cam. JP 2013-242353 discloses one example of the electronic cam in FIG. 4.

However, due to the performance of the motor for driving the focus lens, the focus lens may not be able to be follow the electronic cam immediately and a time lag occurs until the focus lens follows the electronic cam. A blur occurs while the variation of the image plane is being corrected. JP 2009-128614 does not consider this blur. As a consequence, when the camera body sends a focus driving instruction based on a detection result of a focusing state by a phase difference detecting method, the in-focus precision lowers because the blur influence that is eliminated at the time of sending the driving instruction is contained in the driving instruction.

SUMMARY OF THE INVENTION

The present invention provides an optical apparatus and a control method, which can provide precise autofocus on a moving object in an image-pickup optical system configured to correct a variation of an image plane associated with a magnification variation.

An optical apparatus according to the present invention includes an image-pickup optical system configured to form an optical image of an object, the image-pickup optical system including a variable-magnification lens configured to move in an optical axis direction and to change a focal length, and a focus lens configured to move in the optical axis direction for focusing and to correct a variation of an image plane associated with a magnification variation by the variable-magnification lens, a focus lens driver configured to drive the focus lens, and a controller configured to control the focus lens driver so as to maintain an in-focus state associated with the magnification variation, based on information on a tracking curve that represents a position of the focus lens corresponding to an object distance and the focal length of the image-pickup optical system. The controller controls the focus lens driver so as to prevent the focus lens from being moved for focusing based on a difference between an actual position of the focus lens and the position of the focus lens indicated by the tracking curve in a case the focus lens driver is driving the focus lens based on the information on the tracking curve.

Further features of the present invention will become apparent from the following description of exemplary embodiments with reference to the attached drawings.

DESCRIPTION OF THE EMBODIMENTS

Figure 1:
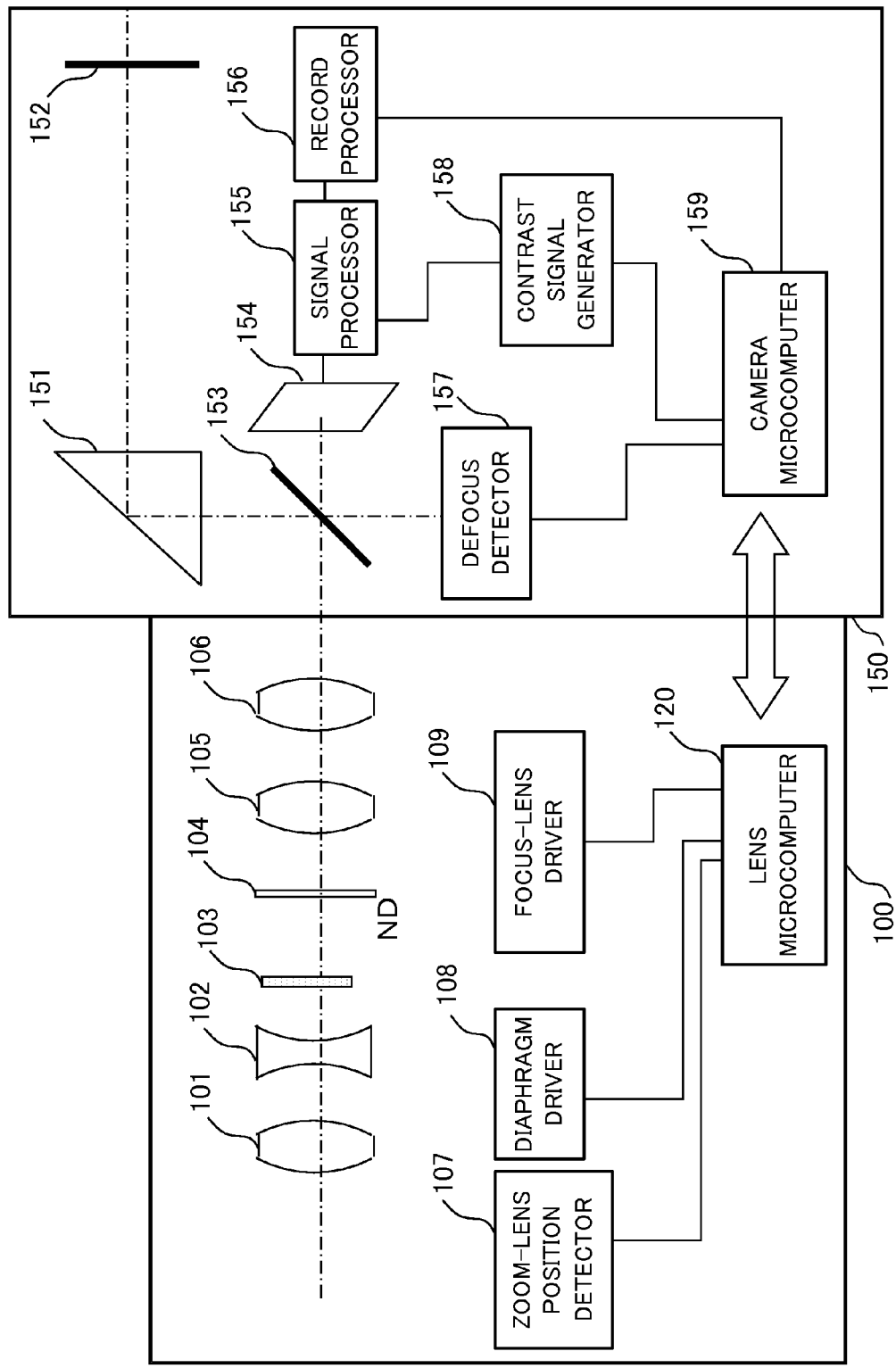
FIG. 1 is a block diagram of a camera system according to this embodiment.

FIG. 1 is block diagram of a lens interchangeable camera system (image-pickup system or optical apparatus) according to this embodiment. The camera system includes a lens unit (interchangeable lens or optical apparatus) 100 and a camera body (image-pickup apparatus or optical system) 150.

The lens unit 100 can be attached to and detached from the camera body 150 via a mount. The lens unit 100 obtains a power supply from the camera body 150. In this embodiment, the camera body 150 is a single-lens reflex camera but the present invention is applicable to a so-called mirror-less camera. The present invention is applicable to a lens integrated type camera. The camera may include a digital video camera or a digital still camera.

The lens unit 100 includes an image-pickup optical system, a zoom-lens-position detector 107, a diaphragm driver 108, a focus lens driver 109, and a lens microcomputer (lens controller) 120.

The image-pickup optical system includes a plurality of optical elements, and forms an optical image of an object. The image-pickup optical system according to this embodiment includes, in order along the incident direction of an object image, a fixed first lens 101, a zoom lens (variable-magnification lens) 102, a diaphragm 103, an ND filter 104, a focus lens 105, and a fixed fourth lens 106. Thus, the image-pickup optical system is of a rear-focus type in which the front lens is fixed. Each lens may actually include one or more lens units, but FIG. 1 illustrates each lens as a single lens for illustration purposes.

The zoom lens 102 is movable in the optical axis direction and changes a focal length. The zoom lens 102 is moved when a user provides a zooming operation (or magnification varying operation) with an operating section (not illustrated). The position of the zoom lens 102 is detected by a zoom-lens-position detector 107 that utilizes a variable resistor, etc. The positional data as a detected result is sent to the lens microcomputer 120. The lens microcomputer 120 converts the positional data into digital data through an internal A/D converter, and uses it for controls as needed.

The diaphragm 103 can adjust an aperture amount (light quantity) with a diaphragm driver 108, and is driven by an instruction from the lens microcomputer 120. The diaphragm driver, such as a stepping motor and a voice coil motor ("VCM"), is controlled with a detector configured to detect a position of the diaphragm 103, such as a Hall sensor configured to detect the current that flows in the coil and a detector configured to detect an end position the diaphragm position.

The ND filter 104 is operated by a user with a mechanical switch (not illustrated), and can be inserted into and ejected from the optical axis. Whether the ND filter is inserted into the optical axis is detected by a detector (not illustrated), such as a photo-interrupter. A plurality of ND filters may be selected or another optical element, such as a color filter, may be selected.

The focus lens 105 is moved in the optical axis direction for focusing by a focus lens driver under control of the lens microcomputer 120.

Since the image-pickup optical system is of a rear focus type, and the focus lens 105 serves to maintain the in-focus state by correcting the variation of the image plane associated with the magnification variation by the zoom lens 102. The tracking control previously saves as zoom tracking data, information on an electronic cam (tracking curve) that represents the in-focus position of the focus lens 105 corresponding to the position of the zoom lens 102 (focal length) for each object distance. As the zoom lens 102 is moved, the position of the focus lens 105 is controlled according to the zoom tracking data.

The camera body 150 includes a viewfinder optical system, a mirror 153, an image sensor 154, a signal processor 155, a record processor 156, a defocus detector 157, a contrast signal generator 158, and a camera microcomputer (camera controller) 159.

The viewfinder optical system includes a penta prism 151 and a viewfinder 152, and enables a photographer to observe the object image. The penta prism 151 inverts the image.

The (main) mirror 153 is movable with a sub-mirror (not illustrated) between a down position (illustrated in FIG. 1) and an up position. The main mirror and the sub-mirror at the down position are arranged on the optical path, and retreats from the optical path at the up position. The mirror 153 is made of a half-mirror, and reflects part of the incident light towards the viewfinder optical system and transmits the remaining light when it is located at the down position. The sub-mirror reflects the light that has transmitted through the mirror 153 towards the defocus detector 157. When the main mirror and the sub-mirror are located at the up position, the incident light forms an image on the image sensor 154.

The defocus detector 157 includes a TTL phase difference detector, etc., is configured to detect a defocus amount using a phase difference detection method of a focus detection (phase difference AF) that detects a focusing state by detecting a phase difference between a pair of image signals of object images. The defocus amount is sent to the camera microcomputer 159.

The image sensor 154 is a photoelectric conversion element, such as a CCD sensor and a CMOS sensor, configured to photoelectrically convert an optical image of an object formed by the image-pickup optical system. Instead of providing the defocus detector 157, an image-plane phase-difference AF may be utilized which is method that performs the phase difference AF on the image plane of the image sensor 154.

An analogue signal output from the image sensor 154 is converted into a digital signal by an A/D converter (not illustrated), and sent to the signal processor 155. The signal processor 155 performs a signal amplification, a color correction, a white balance, etc., for the digital signal, and sends it as a digital image signal to the record processor 156 and the signal generator 158. The record processor 156 stores the digital image signal. The image signal stored in the record processor 156 can be displayed on an electronic viewfinder (not illustrated).

The contrast signal generator 158 generates a contrast signal by using one or more high-frequency signal integrated value(s) made by integrating an amount of a high frequency component picked up by the high-pass filter corresponding to a specific range in the brightness signal. The contrast signal is sent to the camera microcomputer 159, which can determine the in-focus state based on the magnitude of the value.

In this case, the camera microcomputer 159 performs a focus detection of a contrast detecting method (contrast AF). In the contrast AF, the focus state is detected by detecting a contrast peak position of the object image formed by the image sensor through scanning in which the focus position formed by the image-pickup optical system and the position of the image sensor are changed relative to each other.

The camera body 150 is connected to the lens unit 100 both mechanically and electrically via the mount. Each of the lens microcomputer 120 and the camera microcomputer 159 may be a microcomputer or another processor, and includes a memory, such as a ROM and a RAM. The memory stores various data, protocols, and programs, and in particular, the memory of the lens microcomputer 120 stores a program and necessary data of the drive controlling method of the focus lens 105, which will be described with reference to FIGS. 4A and 4B. In case of the lens integrated camera, the information is stored in the memory of the camera microcomputer.

The camera microcomputer 159 communicates with the lens microcomputer 120 at a predetermined period or as needed. The camera microcomputer 159 sends lens control data, such as a focus driving instruction (or driving pulse), an optical information acquisition instruction, a diaphragm driving instruction, etc. The lens microcomputer 120 sends various information of the lens unit, and the camera microcomputer 159 uses this information for the auto-exposure, auto-flash and autofocus ("AF"). The various information of the lens unit contains optical information, such as a focus lens position, a zoom lens potion, a positional sensitivity, a focal length, an image-pickup distance, an object distance, a best focus correction value, an open F-value, a minimum F-value, an exit pupil value, an image height exit pupil value, correction values, and a lens moving amount per one pulse. The lens microcomputer 120 controls driving of a variety of components using various lens control data received from the camera microcomputer 159.

Figure 2A:
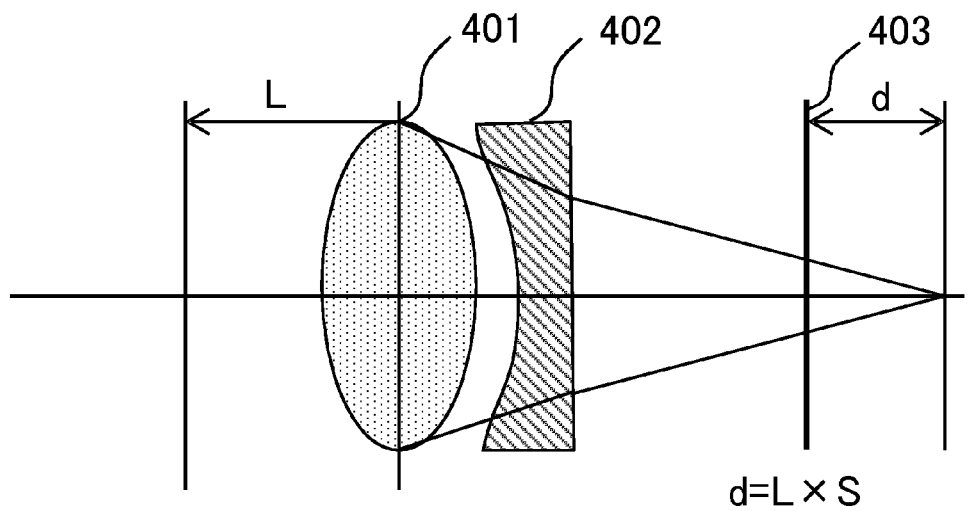
FIGS. 2A-2C are views illustrating positional sensitivity, a relationship between a defocus amount and a lens moving amount, and a relationship between the positional sensitivity and the defocus.
Figure 2B:
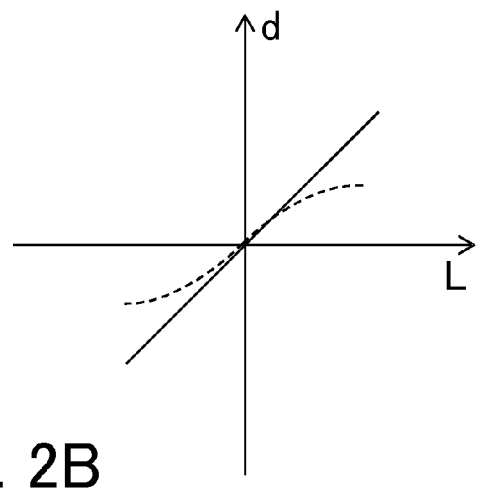
Figure 2C:
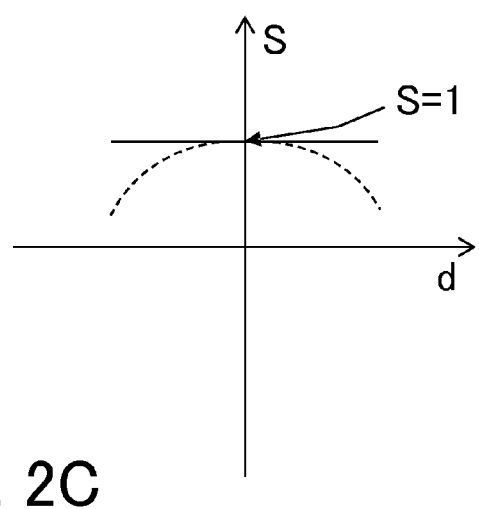

JP 2013-242353 discloses an example in which the focus lens driver 109 is made of a stepping motor in its FIGS. 2A-2C. In this case, the motor shaft of the stepping motor is coupled with a lead screw. A female screw is formed on the inner surface of the holder frame (rack) of the focus lens 105 and engaged with the lead screw as a male screw. The other end of the holder frame crosses the optical path of the photo-interrupter, and the origin is set to the position at which the signal changes. The focus lens 105 is moved in the optical axis direction as the lead screw is rotated by the stepping motor. The lens microcomputer 120 can recognize the position of the focus lens 105 by counting the driving pulse number of the stepping motor from the origin position. The focus position may be represented as a focus pulse count ("FPC") value that is a counted value of the pulse.

The focus lens driver 109 may be a driver in which a minimum moving amount is not fixed, such as a DC motor, and a VCR that generates a driving force with an electromagnetic effect between a magnet and a coil. In this case, an electric position detector may be separately prepared and used to measure a position. Thereby, the position of the focus lens can be recognized.

FIG. 2A is an optical path diagram for explaining the positional sensitivity. FIG. 2B is a graph illustrating a relationship between a defocus amount and a lens moving amount. FIG. 2C is a graph illustrating a relationship between the positional sensitivity and the defocus amount. The positional sensitivity is a numerical value indicating how an image plane moves relative to a moving amount of a lens in the optical axis direction. As the numerical value of the positional sensitivity increases, the image plane farther moves even with a small lens moving amount.

If it is assumed as illustrated in FIG. 2A that reference numerals 401, 402, and 403 denote a focus lens, a fixed fourth lens, and an image sensor, respectively, L is a moving amount of the focus lens 401, d is a defocus amount, a proportional coefficient S of the next expression becomes the positional sensitivity.

$$d = L \times S \quad (1)$$

As illustrated in FIG. 2B, L is set to an abscissa axis, and d is set to an ordinate axis. In a simple lens structure, a relationship L:d=1:1 is established (as illustrated by a solid-line proportional relationship). As illustrated in FIG. 2C, when d is set to an abscissa axis and S is set to an ordinate axis, S may be 1 irrespective of a value of d in FIG. 2C.

However, in a complicated lens, the positional sensitivity changes as the focus lens moves. Depending upon the moving amount of L, a changed value of the positional sensitivity is represented by accumulated d as follows:

$$S = f(d) \quad (2)$$

Herein, f(d) is Taylor-expanded as follows:

$$S = f(d) = S_0 + S_1 d^1 + S_2 d^2 + \ldots + S_n d^n \quad (3)$$

For example, in a lens in which a moving width of d gradually decreases from the 1:1 relationship as L increases, a graph of a broken line is drawn as in FIG. 2B, and a graph of a broken line below S=1 is drawn as the defocus amount increases as illustrated in a broken line as in FIG. 2C. This is formulated as follows:

$$L = d/S = d/(S_0 + S_1 d^1 + S_2 d^2 + \ldots + S_n d^n) \quad (4)$$

In the lens control, the pulse number P may be used instead of the actual moving amount L.

$$P = L/h = d/(h \cdot S) \quad (5)$$

Herein, h (mm/pulse) is a lens moving amount per one pulse. This amount is calculated by the lens unit or the camera body so as to drive the focus lens 105. In general, for a wholly moving lens, S becomes constant. On the other hand, for a lens unit in which part of the optical system is used for focusing, such as a rear focus type and a front lens moving type, S becomes non-constant and S needs coefficients of first and subsequent orders. Basically, the positional sensitivity S changes with a square change of the focal length. S is a value that changes even when the zoom lens or the focus lens is moved, since the focal length changes with the focus lens 105 in the rear-focus type optical system. The positional sensitivity (of usually up to third order) is saved in the lens microcomputer 120 for each area of each of the zoom position and the focus position, so as to use it for a corresponding pair of the zoom position and the lens position. JP 1-232313 discloses the positional sensitivity S in detail, and thus a detailed description thereof will be omitted.

In the phase difference AF, the camera microcomputer 159 receives a defocus amount measured by the defocus detector 157, and the positional sensitivity corresponding to the current focus and zoom positions and a lens driving amount per one pulse previously sent from the lens microcomputer 120. Next, the camera microcomputer 159 calculates a moving amount of the focus lens 105 based on the expression (5) and the lens moving amount per one pulse, and defocus amount and positional sensitivity. The focus position is represented by the FPC value.

The FPC amount as a driving amount of the focus lens 105 is generated based on a fine-adjustment focus moving amount and a correction pulse amount of the optical path length between the defocus detector 157 and the image plane in addition to the above data, and is sent from the camera microcomputer 159 to the lens microcomputer 120. In accordance with the received FPC amount, the lens microcomputer 120 drives the focus lens 105 with the focus lens driver 109. Unless the in-focus state is obtained, the defocus detector 157 may again detect the defocus amount so as to drive the focus lens 105 again.

In the servo AF photography in which the image-pickup optical system focuses on the moving object, the FPC amount to move is calculated by multiplying the defocus amount by the positional sensitivity. At this time, the camera microcomputer 159 obtains from the lens microcomputer 120 the FPC value representing the position of the focus lens 105, and sums it up with the focus lens pulse amount to drive, so as to correspond the current object position with the FPC. This is referred to as an "object FPC" compared with the FPC representative of the position of the focus lens 105.

As the object moves with time, the camera microcomputer 159 obtains the defocus amount, converts the defocus amount into the FPC amount using the positional sensitivity, and calculates the object FPC from the FPC amount. Since the just one previous object FPC and the current object FPC with time are known and they correspond to the object movement, the movement of the object can be assumed to be a uniform motion and the object FPC in executing the next drive instruction is predicted from an acquisition time difference between these two values. The driving instruction corresponding to the FPC value made by subtracting the predicted object FPC from the current FPC is sent to the lens microcomputer 120.

In this embodiment, the object position is recognized with the FPC as the lens position (for the lens plane conversion). Alternatively, the lens position may be converted into the image plane position using the positional sensitivity (for the image plane conversion), and the object position may be recognized with the shift of the image plane position based on the image plane converting value of the converted lens position and the defocus amount.

A description will now be given of a problem that arises when an angle of view is adjusted while the object is focused and the magnification is varied, in a variable-magnification optical system using the electronic cam. In the following description, the object distance during zooming is constant for convenience, but a similar problem occurs with a moving object that changes an object distance.

Figure 3:
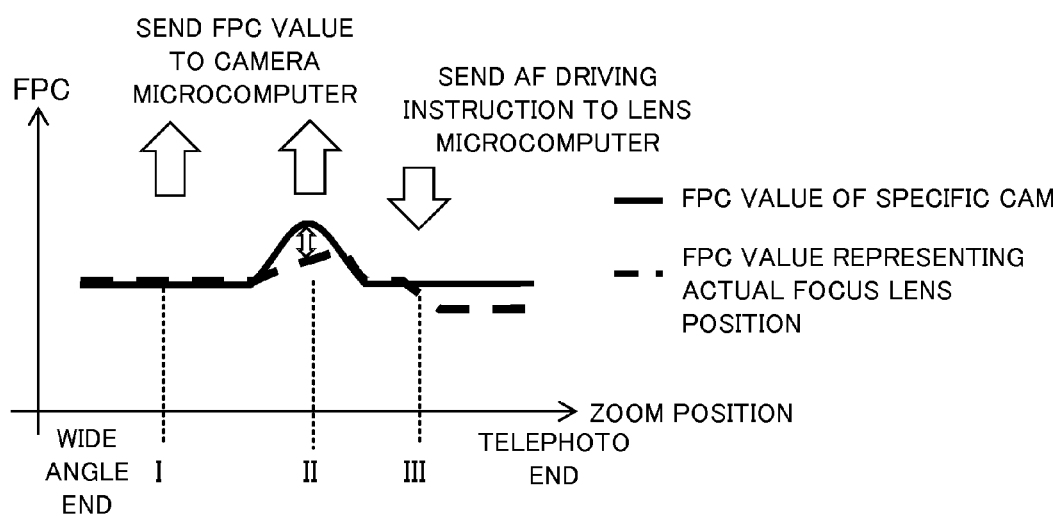
FIG. 3 is a view for explaining a problem of a time lag until a focus lens follows electronic cam.

FIG. 3 is a view illustrating a relationship between a focal length and a focus lens position (FPC) in zooming from a wide angle end to a telephoto end. The abscissa axis denotes a focal length (zoom position), and the ordinate axis denotes a focus lens position (FPC). A solid line denotes a specific cam for the same object distance. A broken line denotes an actual position of the focus lens.

The lens microcomputer can acquire information on the specific cam illustrating by the solid line stored in the memory (not illustrated). From the position detector of the focus lens (not illustrated), the actual position of the focus lens can be obtained as illustrated by the broken line.

In FIG. 3, the camera microcomputer requires the lens microcomputer for the position of the focus lens at focal lengths I and II. Assume that the fixed object is once focused at the telephoto end, and zoomed with the servo AF. There is no change in FPC between the solid line and the broken line at the focal length I.

The electronic cam heaves at the focal length II, and the lens microcomputer performs the tracking control so as to make the focus lens follow it. However, when the zooming changes rapidly, the time lag occurs due to the limited response speed of the stepping motor as the focus motor. This time lag causes a blur at the focal length II as illustrated by a two-directional arrow. The lens microcomputer sends, at the focal length II, the focus lens position illustrated by the broken line to the camera microcomputer.

The camera microcomputer determines that the object has moved, using the phase difference AF at the focal length II on the assumption that the focus lens follows the electronic cam. Therefore, the camera microcomputer calculates a driving amount of the focus lens so as to correct the blur illustrated by the two-directional arrow or the FPC value calculated from the FPC values and the defocus amount at the focal lengths I and II.

The broken line accords with the solid line between the focal length II and the focal length III, and the focus lens follows the electronic cam. The blur attributes to the two-directional direction at the focal length II is consequently eliminated. However, at the focal length III, the camera microcomputer sends the AF driving instruction to the lens microcomputer so as to cancel the blur caused by the two-directional direction. As a result, the focus lens moves by that amount after the focal length III as illustrated in the broken line, causing the overcorrection.

First Embodiment

Figure 4A:
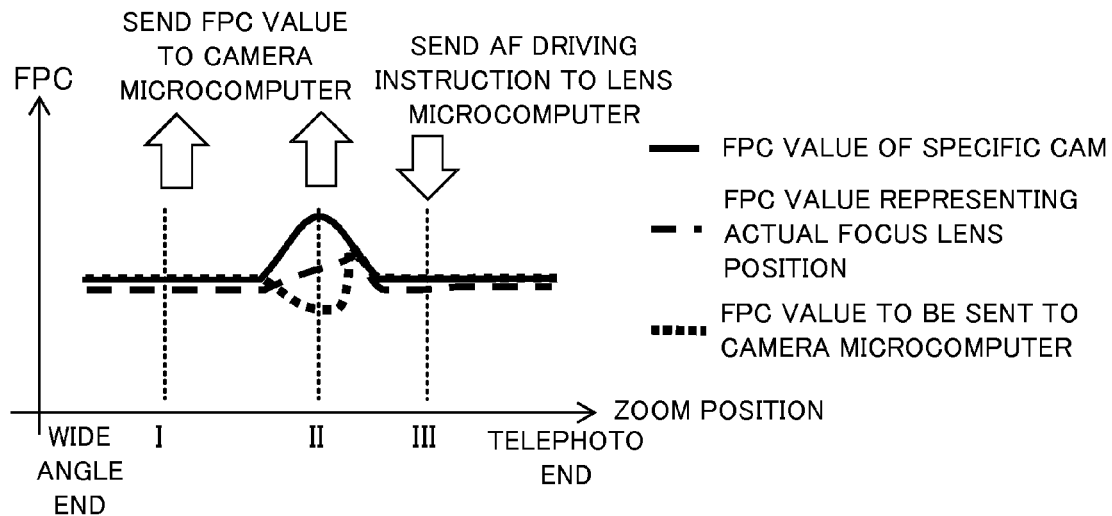
FIGS. 4A and 4B are a view and a flowchart according to a first embodiment for explaining a method for solving the problem illustrated in FIG. 3.
Figure 4B:
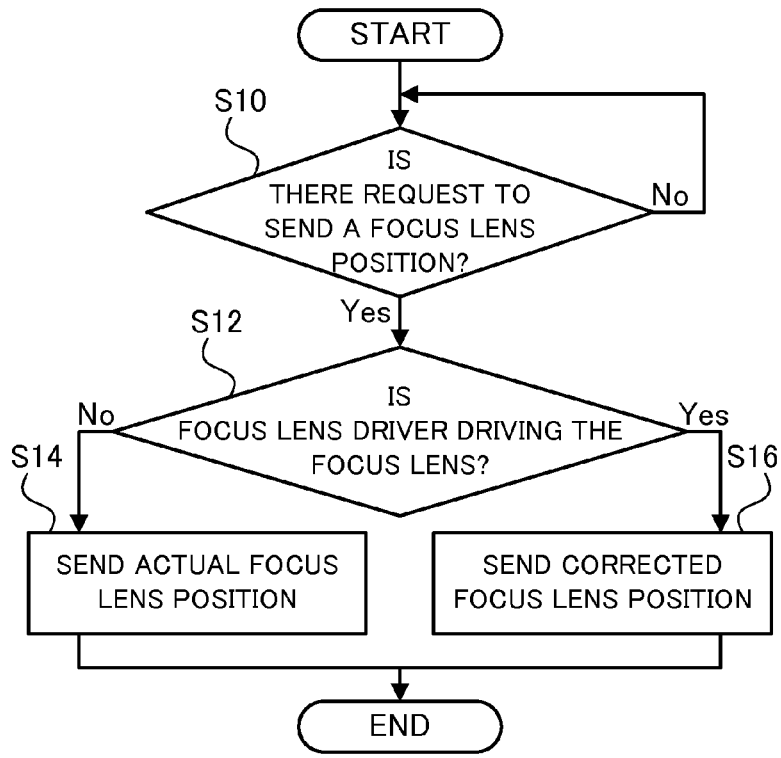

FIG. 4A is a view illustrating a relationship between the focal length and the position of the focus lens 105 (FPC) in zooming from the wide angle end to the telephoto end when a first drive controlling method of the focus lens 105 is applied. FIG. 4B is a flowchart illustrating principal part of the first drive controlling method of the focus lens 105, and "S" denotes the step. The drive controlling method of the focus lens 105 is implemented and stored in the lens microcomputer 120 as a program that enables a computer to execute the position controlling method. This is true of other embodiment.

In FIG. 4A, the abscissa axis denotes a focal length (zoom position), and the ordinate axis denotes a position of the focus lens 105 (FPC). A solid line denotes the specific cam similar to that of FIG. 3. A broken line denotes the position (FPC value) of the focus lens 105. A dotted line denotes the position of the focus lens 105 (FPC value) which the lens microcomputer 120 sends to the camera microcomputer 159.

The lens microcomputer 120 determines whether there is a transmission request for information of the position of the focus lens 105 (S10), waits for the request until it receives it, and determines, if there is, whether the focus lens driver 109 is driving the focus lens 105 (S12). S12 is used to mean whether the focus lens is located on the electronic cam corresponding to the current focal length. In other words, it is determined in S12 whether the focus lens driver 109 is driving the focus lens 105 based on information on the tracking curve.

The lens microcomputer 120 sends the current position of the focus lens, unless the focus lens driver 109 is driving the focus lens 105 (for example, at the focal length I) (S14). On the other hand, the lens microcomputer 120 sends a corrected position of the focus lens 105 when the focus lens driver 109 is driving the focus lens 105 (for example, at the focal length II) (S16). S16 is the same as S14 in FIG. 3, but the first embodiment separates S16 from S14.

In S16, instead of sending back information on the actual position of the focus lens 105, the lens microcomputer 120 sends a value made by subtracting the broken line from the difference between the solid line and the broken line as the corrected position of the focus lens 105. Thereby, a correction component has been subtracted from a moving amount of the AF drive instruction at the focal length III, and the overcorrection can be prevented. When the object is moving, the corrected position is determined based on the positional sensitivity of the zoom lens position and the focus lens position.

Second Embodiment

Figure 5A:
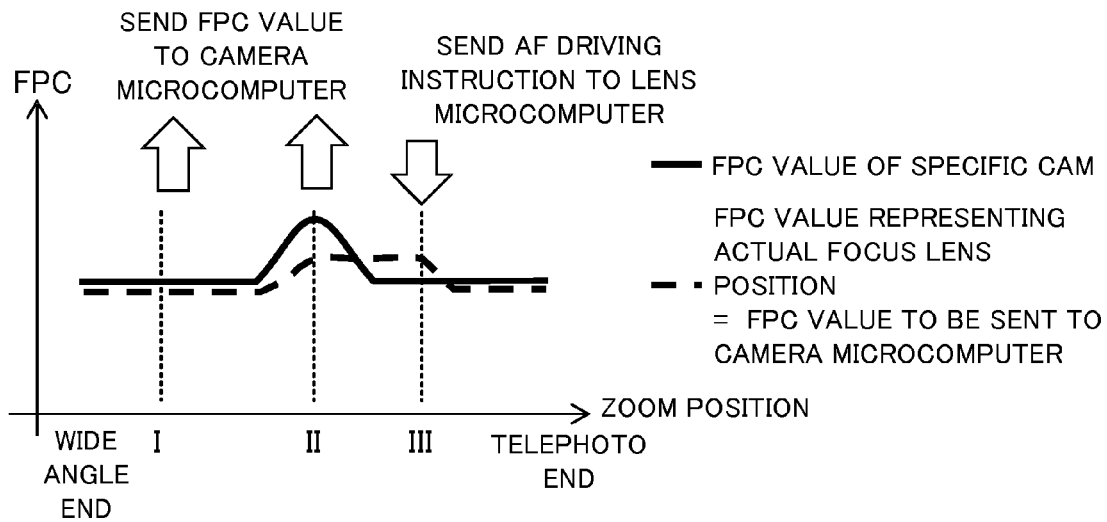
FIGS. 5A and 5B are a view and a flowchart according to a second embodiment for explaining a method for solving the problem illustrated in FIG. 3.
Figure 5B:
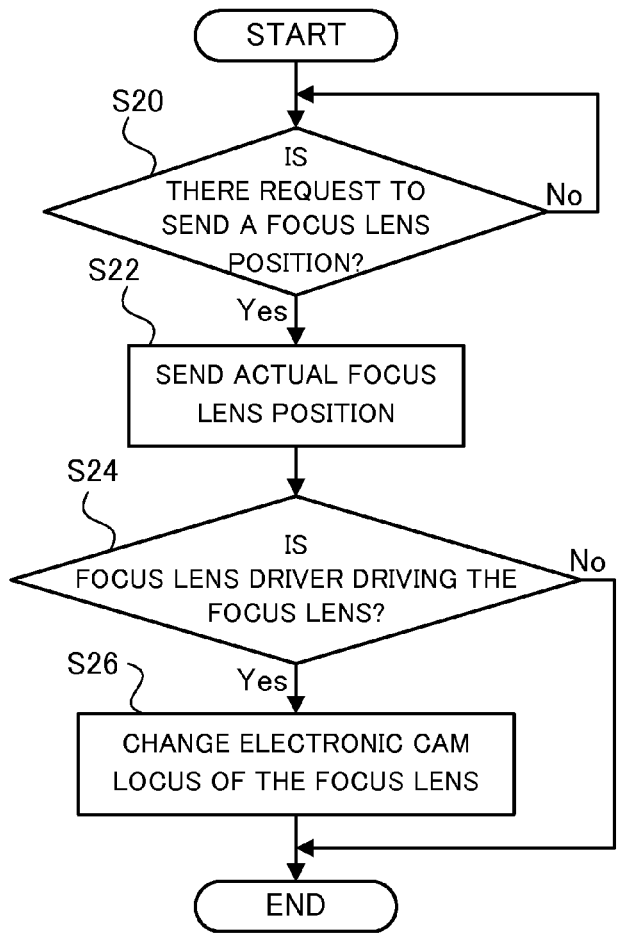

FIG. 5A is a view illustrating a relationship between the focal length and the position of the focus lens 105 (FPC) in zooming from the wide angle end to the telephoto end when a second drive controlling method of the focus lens 105 is applied. FIG. 5B is a flowchart illustrating principal part of the second drive controlling method of the focus lens 105, and "S" denotes the step.

In FIG. 5B, the abscissa axis denotes a focal length (zoom position), and the ordinate axis denotes a position of the focus lens 105 (FPC). A solid line denotes the specific cam similar to that of FIG. 3. A broken line denotes the position of the focus lens 105.

The lens microcomputer 120 determines whether there is a transmission request for information of the position of the focus lens 105 (S20), waits for the request until it receives it, and sends information on the actual position of the focus lens 105 (S22) if there is (both at the focal lengths I and II). However, this embodiment is different from FIG. 3 in further providing S24 and S26. In other words, the lens microcomputer 120 determines whether the focus lens driver 109 is driving the focus lens 105 (S24). S24 is used to mean whether the focus lens is located on the electronic cam corresponding to the current focal length. In other words, it is determined in S24 whether the focus lens driver 109 is driving the focus lens 105 based on information on the tracking curve.

The lens microcomputer 120 terminates the processing unless the focus lens driver 109 is driving the focus lens 105. On the other hand, the lens microcomputer 120 sends the position of the focus lens back to the camera microcomputer 159 when the focus lens driver 109 is driving the focus lens 105, and modifies the electronic cam of the focus lens 105 to a specific cam of another object distance specific cam (S26).

The electronic cam changed in S26 corresponds to the defocus amount of the two-directional arrow in FIG. 3. When the object is moving, the "other object distance" is determined based on the positional sensitivity of the zoom lens position and the focus lens position.

As a result, at the focal length III, the focus lens 105 shifts from the initial specific cam by the defocus amount of the two-directional arrow in FIG. 3. However, as a result of that the focus lens is moved by the AF driving instruction, the focus lens returns to the initial specific cam. When FIG. 4A is compared with FIG. 5A, this embodiment may cause a blur between the focal lengths II and III but can prevent the blur after the focal length III.

Third Embodiment

Figure 6A:
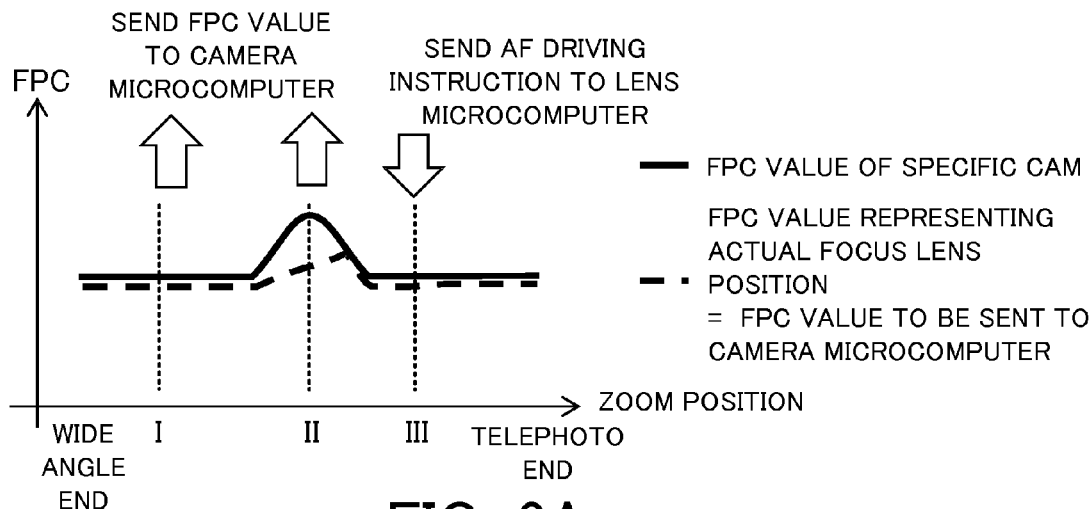
FIGS. 6A and 6B are a view and a flowchart according to a third embodiment for explaining a method for solving the problem illustrated in FIG. 3.
Figure 6B:
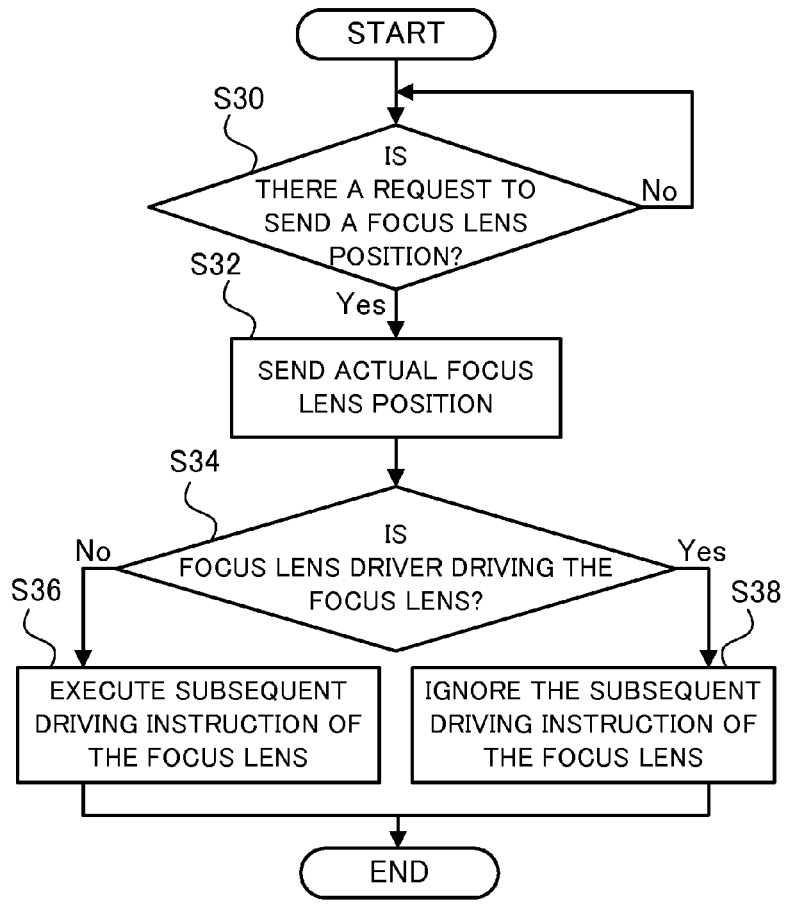

FIG. 6A is a view illustrating a relationship between the focal length and the position of the focus lens 105 (FPC) in zooming from the wide angle end to the telephoto end when a third drive controlling method of the focus lens 105 is applied. FIG. 6B is a flowchart illustrating principal part of the third drive controlling method of the focus lens 105, and "S" denotes the step.

In FIG. 6B, the abscissa axis denotes a focal length (zoom position), and the ordinate axis denotes a position of the focus lens 105 (FPC). A solid line denotes the specific cam similar to that of FIG. 3. A broken line denotes the position of the focus lens 105.

The lens microcomputer 120 determines whether there is a transmission request for information of the position of the focus lens 105 (S30), waits for the request until it receives it, and sends information on the actual position of the focus lens 105 if there is (both at the focal lengths I and II) (S32). Next, the lens microcomputer 120 determines whether the focus lens driver 109 is driving the focus lens 105 (S34). S34 is used to mean whether the focus lens is located on the electronic cam corresponding to the current focal length. In other words, it is determined in S34 whether the focus lens driver 109 is driving the focus lens 105 based on information on the tracking curve.

The lens microcomputer 120 executes the subsequent driving instruction of the focus lens 105 unless the focus lens driver 109 is driving the focus lens 105 (S36). The lens microcomputer 120 ignores the subsequent driving instruction when the focus lens driver 109 is driving the focus lens 105 (S38).

When the focus lens driver 109 drives the focus lens 105 at the focus length II and the subsequent driving instruction of the focus lens 105 at the focal length III is executed, the problem of FIG. 3 may occur. Accordingly, this embodiment ignores (does not execute) the problematic driving instruction of the focus lens 105 so that the focus lens 105 can follow the specific cam. This embodiment does not executes the driving instruction of the amount corresponding to the two-directional arrow in FIG. 3, but the driving instruction for focusing, for example, when the object distance is changed may be executed. Alternatively, all driving instructions may be ignored.

The AF driving instruction may be ignored when the tracking control is performed while the magnification is being varied or when the serve AF is performed, in order to obey other AF driving instructions.

Each of the above embodiments can provide an optical apparatus and a control method, which can provide precise autofocus on a moving object in an image-pickup optical system configured to correct a variation of an image plane associated with a magnification variation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-031385, filed Feb. 21, 2014, which is hereby incorporated by reference herein in its entirety.

What is claimed is:

1. A lens unit that can be attached to and detached from an image-pickup apparatus, the lens unit comprising:
    an image-pickup optical system configured to form an optical image of an object, the image-pickup optical system including a variable-magnification lens configured to move in an optical axis direction and to change a focal length, and a focus lens configured to move in the optical axis direction for focusing and to correct a variation of an image plane associated with a magnification variation by the variable-magnification lens;
    a focus lens driver configured to drive the focus lens; and
    a controller configured to control the focus lens driver so as to maintain an in-focus state associated with the magnification variation, based on information on a tracking curve that represents an in-focus position of the focus lens corresponding to an object distance and the focal length of the image-pickup optical system,
    wherein the controller sends information on an actual position of the focus lens in a case the focus lens driver is not driving the focus lens based on the information on the tracking curve when the controller receives a transmission request for information on the in-focus position of the focus lens from the image-pickup apparatus, and
    wherein the controller sends information on a corrected position of the focus lens calculated by a difference between the actual position of the focus lens and the in-focus position of the focus lens indicated by the tracking curve in a case the focus lens driver is driving the focus lens based on the information on the tracking curve when the controller receives the transmission request for the information on the in-focus position of the focus lens from the image-pickup apparatus.

2. An optical apparatus comprising:
    a lens unit, and an image-pickup apparatus to which the lens unit is detachably attached, the lens unit including;
    an image-pickup optical system configured to form an optical image of an object, the image-pickup optical system including a variable-magnification lens configured to move in an optical axis direction and to change a focal length, and a focus lens configured to move in the optical axis direction for focusing and to correct a variation of an image plane associated with a magnification variation by the variable-magnification lens;
    a focus lens driver configured to drive the focus lens; and
    a controller configured to control the focus lens driver so as to maintain an in-focus state associated with the magnification variation, based on information on a tracking curve that represents an in-focus position of the focus lens corresponding to an object distance and the focal length of the image-pickup optical system,
    wherein the controller sends information on an actual position of the focus lens in a case the focus lens driver is not driving the focus lens based on the information on the tracking curve when the controller receives a transmission request for information on the in-focus position of the focus lens from the image-pickup apparatus, and wherein the controller sends information on a corrected position of the focus lens calculated by a difference between the actual position of the focus lens and the in-focus position of the focus lens indicated by the tracking curve in a case the focus lens driver is driving the focus lens based on the information on the tracking curve when the controller receives the transmission request for the information on the in-focus position of the focus lens from the image-pickup apparatus.

3. A lens unit that can be attached to and detached from an image-pickup apparatus, the lens unit comprising:

an image-pickup optical system configured to form an optical image of an object, the image-pickup optical system including a variable-magnification lens configured to move in an optical axis direction and to change a focal length, and a focus lens configured to move in the optical axis direction for focusing and to correct a variation of an image plane associated with a magnification variation by the variable-magnification lens;

a focus lens driver configured to drive the focus lens; and a controller configured to control the focus lens driver so as to maintain an in-focus state associated with the magnification variation, based on information on a tracking curve that represents an in-focus position of the focus lens corresponding to an object distance and the focal length of the image-pickup optical system, wherein the controller sends information on an actual position of the focus lens when the controller receives a transmission request for information on the in-focus position of the focus lens from the image-pickup apparatus, and wherein the controller modifies the tracking curve based on a difference between the actual position of the focus lens and the in-focus position of the focus lens indicated by the tracking curve in a case the focus lens driver is driving the focus lens based on the information on the tracking curve when the controller receives the transmission request for the information on the in-focus position of the focus lens from the image-pickup apparatus.

4. A lens unit that can be attached to and detached from an image-pickup apparatus, the lens unit comprising:

an image-pickup optical system configured to form an optical image of an object, the image-pickup optical system including a variable-magnification lens configured to move in an optical axis direction and to change a focal length, and a focus lens configured to move in the optical axis direction for focusing and to correct a variation of an image plane associated with a magnification variation by the variable-magnification lens;

a focus lens driver configured to drive the focus lens; and a controller configured to control the focus lens driver so as to maintain an in-focus state associated with the magnification variation, based on information on a tracking curve that represents an in-focus position of the focus lens corresponding to an object distance and the focal length of the image-pickup optical system, wherein the controller sends information on an actual position of the focus lens when the controller receives a transmission request for information on the in-focus position of the focus lens from the image-pickup apparatus, wherein the controller executes a driving instruction of the focus lens sent from the image-pickup apparatus after sending information on the actual position of the focus lens in a case the focus lens driver is not driving the focus lens based on the information on the tracking curve when the controller receives the transmission request for the information on the in-focus position of the focus lens from the image-pickup apparatus, and wherein the controller does not execute the driving instruction of the focus lens sent from the image-pickup apparatus based on a difference between the actual position of the focus lens and the in-focus position of the focus lens indicated by the tracking curve after sending information on the actual position of the focus lens in a case the focus lens driver is driving the focus lens based on the information on the tracking curve when the controller receives the transmission request for the information on the in-focus position of the focus lens from the image-pickup apparatus.

* * * * *